US008264967B2

(12) United States Patent
Liu

(10) Patent No.: US 8,264,967 B2
(45) Date of Patent: *Sep. 11, 2012

(54) BIT-FIELD-ENCODED RESOURCE RECORD FOR DETERMINING A TRANSMISSION PATH IN A COMMUNICATIONS NETWORK

(75) Inventor: Stephen S. Liu, Acton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/965,380

(22) Filed: Dec. 27, 2007

(65) Prior Publication Data

US 2008/0107041 A1 May 8, 2008

Related U.S. Application Data

(63) Continuation of application No. 10/632,613, filed on Aug. 1, 2003, now Pat. No. 7,336,617.

(51) Int. Cl.
*H04J 1/16* (2006.01)
*H04L 12/28* (2006.01)

(52) U.S. Cl. ............ 370/238.1; 370/400; 370/410; 370/465

(58) Field of Classification Search ............ 370/238.1, 370/400, 410, 465
See application file for complete search history.

(56) References Cited

U.S. PATENT DOCUMENTS

| | | | |
|---|---|---|---|
| 6,529,316 B1 * | 3/2003 | Treyz et al. | 359/337.11 |
| 6,657,180 B1 * | 12/2003 | Monnet et al. | 250/214.1 |
| 6,801,496 B1 | 10/2004 | Saleh et al. | |
| 6,856,627 B2 | 2/2005 | Saleh et al. | |
| 6,985,959 B1 * | 1/2006 | Lee | 709/238 |
| 7,027,731 B1 | 4/2006 | Wang et al. | |
| 7,047,316 B2 | 5/2006 | Iwata et al. | |
| 7,092,356 B2 | 8/2006 | Rabie et al. | |
| 7,248,579 B1 * | 7/2007 | Friedman | 370/389 |
| 7,336,617 B1 * | 2/2008 | Liu | 370/252 |
| 2002/0166956 A1 * | 11/2002 | Graves | 250/227.23 |
| 2002/0173332 A1 | 11/2002 | Mukai et al. | |
| 2003/0018821 A1 | 1/2003 | Chow et al. | |
| 2004/0047636 A1 * | 3/2004 | Guild et al. | 398/147 |
| 2004/0174815 A1 | 9/2004 | Khisti et al. | |
| 2006/0155873 A1 | 7/2006 | Twata et al. | |
| 2008/0075011 A1 * | 3/2008 | Mack-Crane et al. | 370/238 |
| 2010/0040367 A1 * | 2/2010 | Oki et al. | 398/45 |

OTHER PUBLICATIONS

Fredette, at al., "Link Management Protocol (IMP) for WDM Transmission Systems", Internet Draft, http://www,ietf.org/ief-filidabstracts.txt!draft-ietf-camp-imp-wdm-wdm-01.txt, Printed Apr. 1, 2003, Sep. 2002.
Katz, at al., "Traffic Engineering Extensions to OSPF", Internet Draft, http://www.Letf.org/ietf/lidabstracts.txt/draft-katz-yeung-ospf-traffic-09.txt, Printed Apr. 1, 2003, Oct. 2002.
Li, at aI., "IS-1S Extensions for Traffic Engineering", Internet Draft, http://www.ietf.org/ietfilidabstracts.txt/draft-ietf-isis-traffic-04.txt, Printed Apr. 1, 2003, Dec. 2002.

* cited by examiner

*Primary Examiner* — Andrew Lee

(57) ABSTRACT

Method and apparatus for tracking, recording and distributing link state characteristics over communications networks. The invention allows network operators to efficiently define, track, store and disseminate link state characteristics using a bit-field-encoded resource record that is capable of representing many more link state characteristics than the bit-mask-encoded records used in existing systems. As a result, the present invention, when used in conjunction with standard routing and network maintenance algorithms, provides a much more efficient method than existing systems provide, for performing sophisticated networking tasks, such as handling complicated information transmission requests, setting up and tearing down network paths, and making dynamic routing decisions.

16 Claims, 3 Drawing Sheets

FIG. 2: An example of 32-bit link resource record

BIT-FIELD-ENCODED RESOURCE RECORD FOR DETERMINING A TRANSMISSION PATH IN A COMMUNICATIONS NETWORK

CROSS REFERENCE TO RELATED CASES

The present application is a continuation of U.S. patent application Ser. No. 10/632,613 filed on Aug. 1, 2003, the contents of which are hereby incorporated by reference.

BACKGROUND OF THE INVENTION

1. Field of Art

The present invention relates to communications networks and, more specifically, to methods and apparatuses for disseminating link state information throughout a communications network and using such information to make dynamic, end-to-end routing decisions for video, voice and data transmissions.

2. Related Art

Many of the conventional routing protocol standards for communications networks require that each node in the network advertise to all other nodes in the network a set of link characteristics, or attributes, associated with each link connected to that node. These link characteristics are commonly known as the "link state" characteristics. Among other things, the link state characteristics may include, for example, routing-related parameters, such as a link metric for a shortest path calculation, a maximum bandwidth, a maximum reservable bandwidth, and/or an amount of unreserved bandwidth. These link state characteristics are typically used by one or more routing algorithms in the system to make dynamic routing decisions (a process known as "traffic engineering") for each data transmission path across the network.

The typical way of tracking, storing and disseminating link state characteristics in a communications network is to use what is known as a link resource record (sometimes referred to as a resource class identifier, a link color bit mask, or link color bit vector). Currently proposed standards for link resource records typically comprise a 4-byte (or 32-bit) bit-mask-encoded record (or vector) that may be used by a service provider to categorize each link in the provider's network into thirty-two distinct classes. The 32-bit bit-mask-encoded record is supposed to facilitate faster and more efficient provisioning of transmission services, as well as more intelligent routing decisions based on sophisticated service and transport constraints. Since conventional standards do not restrict the actual definitions for the thirty-two classes that can be represented by the bit-mask-encoded record, network administrators may define their own sets of classes.

While a bit-mask-encoded resource record of 32 bits may be adequate for many of today's communications networks, there are some disadvantages associated with using it that are becoming more and more significant. For example, it is widely believed in the telecommunications industry that future multiple services (i.e., data, voice, and video) communications networks (MSCN) will be comprised almost entirely, if not entirely, of fiber-optic transmission equipment. MSCNs that include fiber-optic technology are usually called optical transport networks (OTNs). Conventional OTNs usually are not entirely optical in that they typically include electronic signal processing equipment, such as optoelectronic switches, at nodes in the overall network topology that become intermediate nodes in a given communications path. An optoelectronic switch receives an optical signal, converts it to an electronic signal, performs local switching in the electronic domain, and converts the electronic signal back to an optical signal at an egress port before sending the signal out to the next optoelectronic switch on the path. This process is called OEO conversion. OTNs that utilize electronic signals and OEO conversion during transmission are often called "opaque" OTNs.

Pure OTNs, however, do not convert optical signals to electronic signals during transmission. In a pure OTN, the signals remain entirely in the optical domain from source to destination. Pure optical transport networks are usually referred to as "transparent" OTNs.

The majority of OTNs in operation today are opaque. However, the industry as a whole is shifting away from opaque OTNs and toward transparent OTNs because, in a transparent OTN, optical signals do not need to be processed (e.g., no OEO conversion) as they pass through intermediate nodes. Thus, transparent OTNs typically operate faster, require less equipment than opaque OTNs, and cost much less to build.

To address concerns that their current opaque OTNs are not cost effective and do not benefit from today's rapidly-occurring advances in optical technologies, many carriers in the telecommunications industry are attempting to drive down capital expenses and to "future-proof" their networks by deploying phototonic cross connect (PXC) switches (often described as optical wavelength switches) and hybrid switches in their OTNs. A PXC acts as bridge in a communications path of an optical network, linking light signals of different wavelengths together at the node where two networks meet. A hybrid switch, on the other band, includes in one box the functionality of both a PXC and an optoelectronic switch. Thus, a hybrid switch can be configured to simultaneously process electronic signals and perform OEO conversion, as well as connect and relay optical signals as would be performed by a regular PXC. The purpose of the optoelectronic functionality in a hybrid switch is to convert locally-originating electronic signals to optical signals for delivery over an OTN, and conversely, to convert optical signals received from an OTN into electronic signals for delivery to one or more electronic destinations.

PXCs are frequently interconnected with dense wavelength division multiplex (DWDM) line systems. In some implementations, DWDM line system functionality is integrated with a PXC in one device called a wavelength cross-connect (WXC). DWDM is a technology that puts data from different sources together on a single optical fiber, with each signal being carried simultaneously on its own distinct optical wavelength. Using DWDM, up to 128 (and theoretically more) separate wavelengths, or channels of data, can be multiplexed into a lightstream, transmitted on a single optical fiber, and de-multiplexed back onto separate optical fibers at the destination end of the transmission path. Since every wavelength (and, hence, every channel) is de-multiplexed onto a separate channel at the destination end, different data formats being transmitted at different data rates may be transmitted over a single optical fiber simultaneously. Thus, Internet Protocol (IP) data, Synchronous Optical Network data (SONET), and asynchronous transfer mode (ATM) data, for example, can all be transmitted within the same optical fiber at the same time.

DWDM, sometimes called wave division multiplexing (WDM), is widely expected to solve the bandwidth exhaustion problem associated with some fiber-optic networks. In a system like Lucent's LambdaXtreme, for example, which supports 128 wavelengths with each wavelength carrying a signal at 10 Gbps, up to 1.28 Tetra Bits of information can be delivered per second by a DWDM-enabled optical fiber. Accordingly, PXC and DWDM promise to be two of the key technologies used in the all-optical networks of the future.

Optical links in a transparent OTN, especially optical links controlled by DWDM technology, have many more link state characteristics associated with them than optical links used in an opaque OTN. Therefore, when the OTN is a transparent OTN incorporating optical links, DWDM and PXCs, there are many more link state characteristics that must be disseminated throughout the network and used by the routing algorithms to make dynamic routing decisions. Moreover, in order to comply with numerous standard routing protocols, each PXC in an OTN must advertise to each other PXC in the network all of the link state characteristics associated with each link connected to the PXC, including, for example, optical fiber types, wavelengths and wavelength bands used on the link, the type of dispersion compensation technique used on the link, a DWDM line encoding scheme associated with the link, and so on.

As stated above, the 32-bit bit-mask-encoded resource record has been proposed for use as an industry standard. Three such proposals are presented, for example, in Katz, D., et al, *Traffic Engineering Extensions to OSPF*, Internet Draft, draft-katz-yeung-ospf-traffic-09.txt, Li, T. and Smit, H., *IS-IS Extensions for Traffic Engineering*, Internet Draft, draft-ietf-isis-traffic-04.txt, and Fredette, A. and Lang, J., *Link Management Protocol (LMP) for WDM Transmission Systems*, Internet Draft, draft-ietf-camp-lmp-wdm-wdm-01.txt, which may be accessed on the Internet Engineering Task Force's (IETF) website at http://www.ietf.org/ietf/1id-abstracts.txt. All of these references are incorporated herein in their entirety by this reference.

However, the 32-bit bit-mask-encoded resource record restricts the maximum number of classes (or categories) to thirty-two, which are far too few categories to adequately describe the numerous characteristics associated with links in certain types of networks, such as, for example, a typical OTN. In order to address this restriction, some of the hitherto proposed schemes introduce a separate record or object to represent each optical link characteristic. In such a cases, however, each new record or object requires more bits to represent the same amount of information, additional bandwidth to disseminate the additional bits throughout the network, and additional processing power to process the additional bits. Thus, schemes that rely on defining new records and objects for each type of characteristic are inherently less efficient.

In the interest of addressing these and other problems associated with using conventional link resource record systems, what is needed is a more efficient and less demanding method of representing and disseminating potentially hundreds of thousands of link state characteristics that need to be represented in OTNs with DWDM-controlled links. Such a system would be even more useful if it were adapted for use in conjunction with standard link state routing protocols, such as Open Shortest Path First (OSPF) protocol, Constrained Shortest Path First (CSPF) protocol, Intermediate System to Intermediate System (IS-IS) protocol and Private Network-to-Private-Network Interface (PNNI) protocol.

SUMMARY OF INVENTION

Using the fiber-optic technology currently available, it is frequently necessary or desirable, depending on the application, to classify each optical link in an OTN according to some combination of at least eight distinct fiber types, up to 320 distinct wavelengths, 6 distinct frequency bands, 4 distinct dispersion compensation techniques and 4 distinct line coding schemes. As a result, there are a total of at least 245,760 (8×320×6×4×4) distinct classification possibilities for each optical link, all of which might be used by the routing algorithms for TWS provisioning and dynamic routing of video, voice and data traffic. The present invention provides a resource record that can be both bit-field and bit-mask encoded instead of just bit-mask-encoded. With bit-field encoding, the resource record may be divided into fields of various lengths, with each field carrying encoding schemes for different link characteristics. With a 32-bit resource record, for instance, the right-most four bits may be designated as a bit-field to encode fiber types for DWDM links (i.e., a total of 16 types of fibers can be represented with the four-bit field). The next 14 bits may be defined to represent 16,384 different wavelengths to be deployed in an OTN, and the next 4 bits may be used to represent dispersion-compensation techniques, and so on. Thus, the bit-field scheme of the present invention is very flexible in that it allows a resource record of any length greater than one bit to be configured as a combination of bit-fields and bit masks, as desired, according to the preference of the network administrator.

Depending on the requirements of the particular OTN, the network administrator may configure the resource record of the present invention to have a length of 4 bits, 16 bits, 32 bits, 64 bits, 128 bits, or any other length necessary or desired. If the length of the resource record used is 32 bits, for example, the bit-field encoding scheme of the present invention extends the range of link state class representation from a mere thirty-two classes to a maximum of $2^{}32$ (or 4 billion) different classes, thereby vastly increasing the number of link state characteristics that can be represented and greatly improving the performance and efficiency of dynamic on-demand provisioning for TWS. If the length of the resource record is 64 bits, the present invention would extend the range of link state classes to a maximum of $2^{}64$, or 18 quintillion, different values, and so on.

In accordance with the present invention, there is provided a method for transmitting information (such as voice or video data, for example) over a communications network (such as an OTN). The method comprises the steps of receiving a request to transmit the information according to a service constraint, generating a transport constraint based on the service constraint, parsing the contents of a bit-field-encoded record corresponding to a link in the communications network to determine whether the link is capable of supporting the transport constraint, and, if so, transmitting the information over the link. The bit-field-encoded record comprises at least one field having a length of at least two bits. Preferably, although not necessarily, the record contains multiple fields of varying lengths. In this aspect of the invention, the various fields may be configured to hold certain transport constraint values, such as a line-coding field, a dispersion compensation technique field, a frequency band field, a wavelength and wavelength band identifier field, a fiber type field, or some combination of any number of these or other fields.

The bit-field-encoded record of the present invention may be used with electronic networks, as well as transparent or opaque optical networks. If used with an optical network, the optical network also may include a phototonic cross-connect device, which may be coupled to one or more DWDM-controlled links. In a preferred embodiment, the contents of the bit-field-encoded record are parsed according to a specified bit-field definition defining a class of information the link is configured to carry. The service constraint may comprise, for example, a bandwidth requirement, or a request to use or avoid using a specified node, and/or a request to use or avoid using a specified link in the OTN.

In a preferred embodiment, the method further includes the steps of: (1) forming a new network topology comprised of the set of links in the communications network that are capable of supporting the requested transport constraint; (2) selecting a subset of links from the new network topology to form a route for transmitting the information; and (3) recording the new network topology in a network topology database. The route may be determined according to a preferred link state shortest path routing algorithm, such as the Dijkstra shortest path first algorithm or the Bellman-Ford Vector algorithm.

The method may further comprise the step of storing the bit-field-encoded record in a centralized link state database, or, alternatively, in a plurality of link state databases, each one residing at a single node (such as a PXC) in the network. Notably, the bit-field-encoded record may comprise both a bit-field encoded portion and a bit-mask-encoded portion, which allows more flexibility in defining how the resource record may be used.

According to another aspect of the invention, there is also provided a method for identifying a link for transmitting information in a communications network. This aspect of the invention comprises the steps of: (1) receiving a request to transmit the information, said request including a service constraint; (2) generating a requested transport constraint based on the service constraint; (3) parsing the contents of a bit-field-encoded record associated with the link to determine whether the link is capable of supporting the requested transport constraint; and (4) comparing the requested transport constraint with the supported transport constraint. As with the other aspects of the invention summarized above, the bit-field-encoded record comprises at least one field having a length of at least two bits, which is configured to specify a supported transport constraint for the link. Preferably, however, the network administrator can take advantage of the present invention to define multiple fields, which are then configured to specify a variety of supported transport constraints, including, for example, a fiber type or dispersion compensation technique associated with the link. Finally, the method may include, but does not necessarily include, the step of transmitting the information over the identified link.

In yet another aspect, another method of transmitting information over a communications network is provided. However, instead of identifying or determining the characteristics of a single link, this method identifies a whole set of network links capable of supporting the requested transport constraint by parsing the contents of a plurality of bit-field-encoded records, each one of the records in the plurality being configured to specify a supported transport constraint. After identifying the set of links that support the requested transport constraint, the information is transmitted over a subset of the identified links.

In some embodiments, the request to transmit the information may itself included the requested transport constraint, thereby making it unnecessary to generate a requested transport constraint from a service constraint. Accordingly, the present invention may also be configured to provide a method of transmitting information over a communications network without receiving a service constraint.

In still another aspect of the invention, a system for transmitting information over a communications network is provided, comprising means for receiving a request to transmit the information, said request including a service constraint, means for converting the service constraint into a transport constraint, means for parsing the contents of a bit-field-encoded record corresponding to a link in the optical network to determine whether the link is capable of supporting the transport constraint, and means for transmitting the information over the link.

In yet another aspect, a system for transmitting information over an communications network (which, again, may be an electronic network or a transparent or opaque OTN) is provided, which comprises a constraint processor configured to receive a request to transmit the information, said request including a service constraint, and to convert the service constraint into a requested transport constraint associated with the service request, a bit-field-encoded record associated with a link in the network, and a routing processor configured to parse the contents of the bit-field-encoded record to determine whether the link is capable of supporting the transport constraint associated with the information. Preferably, although not necessarily, the system further comprises a link state database for storing one or more bit-field-encoded records, a network topology database for storing a set of links in the network capable of supporting the requested transport constraint, and a routing table configured to store the selected route for the transmission. The databases and routing tables may be centralized or distributed throughout the network. Preferably, the route is selected according to a link state shortest path first (SPF) routing algorithm, such as the Dijkstra SPF algorithm or the Bellman-Ford Vector algorithm.

In a further aspect of the invention, the system further comprises a plurality of bit-field-encoded records, each record including a field configured to specify whether a link in the optical network supports the requested transport constraint. In this embodiment, the routing processor is further configured to parse the contents of each bit-field-encoded record in the plurality of bit-field-encoded records to identify a set of links in the communications network capable of supporting the requested transport constraint. This aspect may also include a link state database configured to store the plurality of bit-field-encoded records, as well as a network topology database and a routing table, as described in more detail below with reference to FIG. 1.

Additional embodiments and features of the present invention are set forth in part in the description that follows, and in part are apparent from the description, or may be learned by practice of the invention. The embodiments and features of the invention may also be realized and attained by means of the instrumentalities and combinations particularly set out in the appended claims.

BRIEF DESCRIPTION OF THE FIGURES

The foregoing summary, as well as the following detailed description, will be best understood in conjunction with the attached drawings, which are incorporated in and constitute part of the specification. The drawings illustrate examples of preferred embodiments of the invention, and, together with the description, serve to explain the principles of the present invention.

DETAILED DESCRIPTION OF THE PREFERRED EMBODIMENTS

Reference will now be made in detail to preferred embodiments of the invention, examples of which are illustrated in some of the drawings. Notably, the present invention may be implemented using software, hardware, or any combination thereof, as would be apparent to those of ordinary skill in the art. Therefore, the figures and examples below are not meant to limit the scope of the present invention or its embodiments or equivalents. Although the preferred embodiments are explained and illustrated by references and examples involving optical transport networks (OTNs), optical links, PXCs and DWDM-enabled links and devices, the invention may be advantageously applied in any type of network where it is necessary or desirable to specify, record and disseminate link state characteristics throughout. Therefore, it is understood that the invention finds application in numerous other types of communications networks, such as pure electronic networks, wireless networks, and the like.

Figure 1:
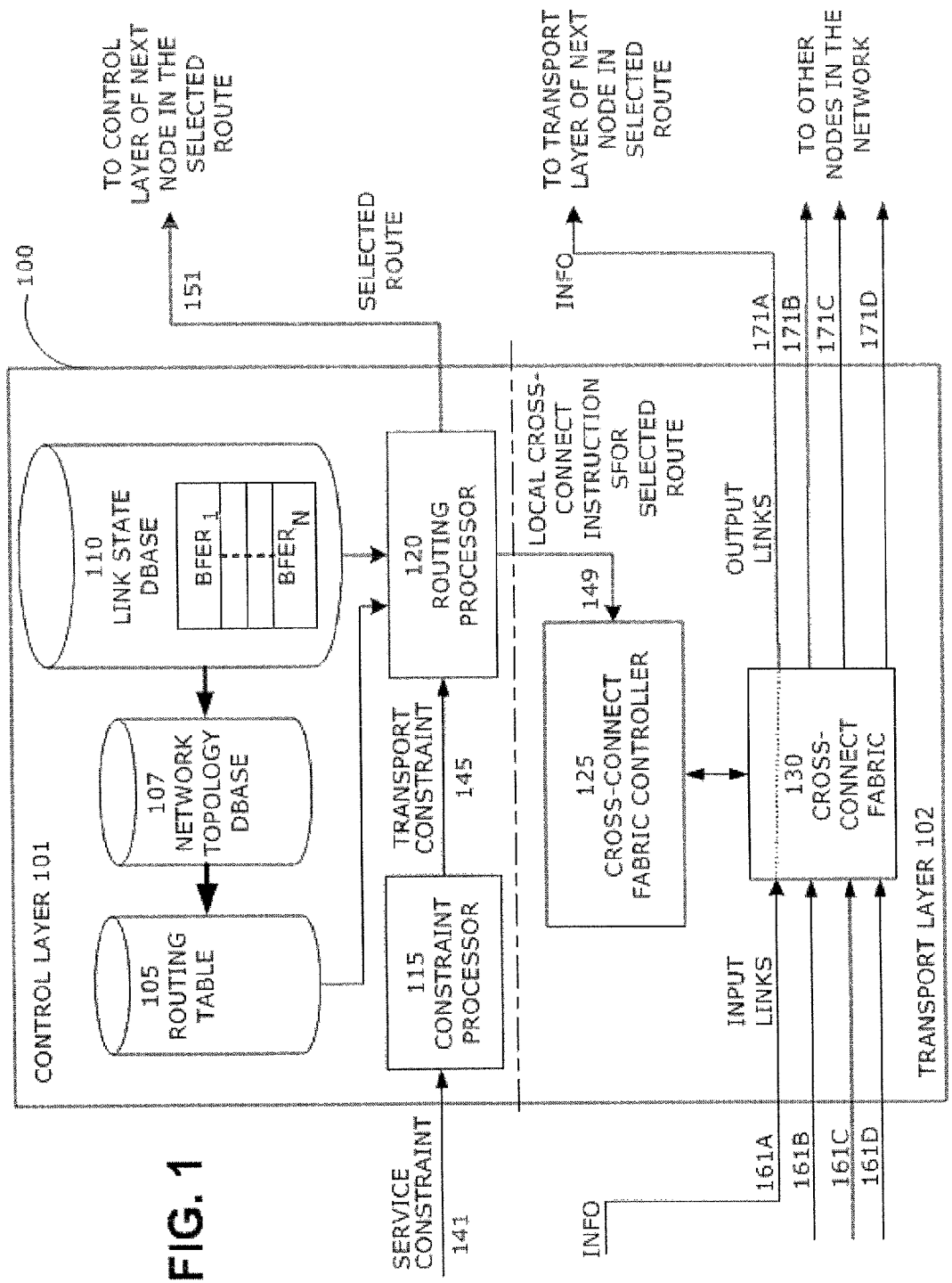
FIG. 1 shows a high-level block diagram of a communications network configured to operate according to the present invention.

FIG. 1 shows a high-level block diagram of a Phototonic Cross-Connect (PXC) Node 100 in a communications network configured to operate according to the present invention. As shown in FIG. 1, PXC Node 100 comprises a Control Layer 101, which manages the route processing for PXC Node 100, and a Transport Layer 102, which contains the actual switching apparatus that operates under the control of the processors residing in Control Layer 101. In a preferred embodiment, Control Layer 101 comprises a Link State Database 110, a Constraint Processor 115, a Routing Processor 120, a Network Topology Database 107 and a Routing Table 105. Link State Database 110 contains a plurality of bit-field-encoded resource records (shown in FIG. 1 as $BFER_1$ through $BFER_N$), which have been configured to specify whether each link in a plurality of links in the network supports one or more defined transport constraints.

Figure 2:
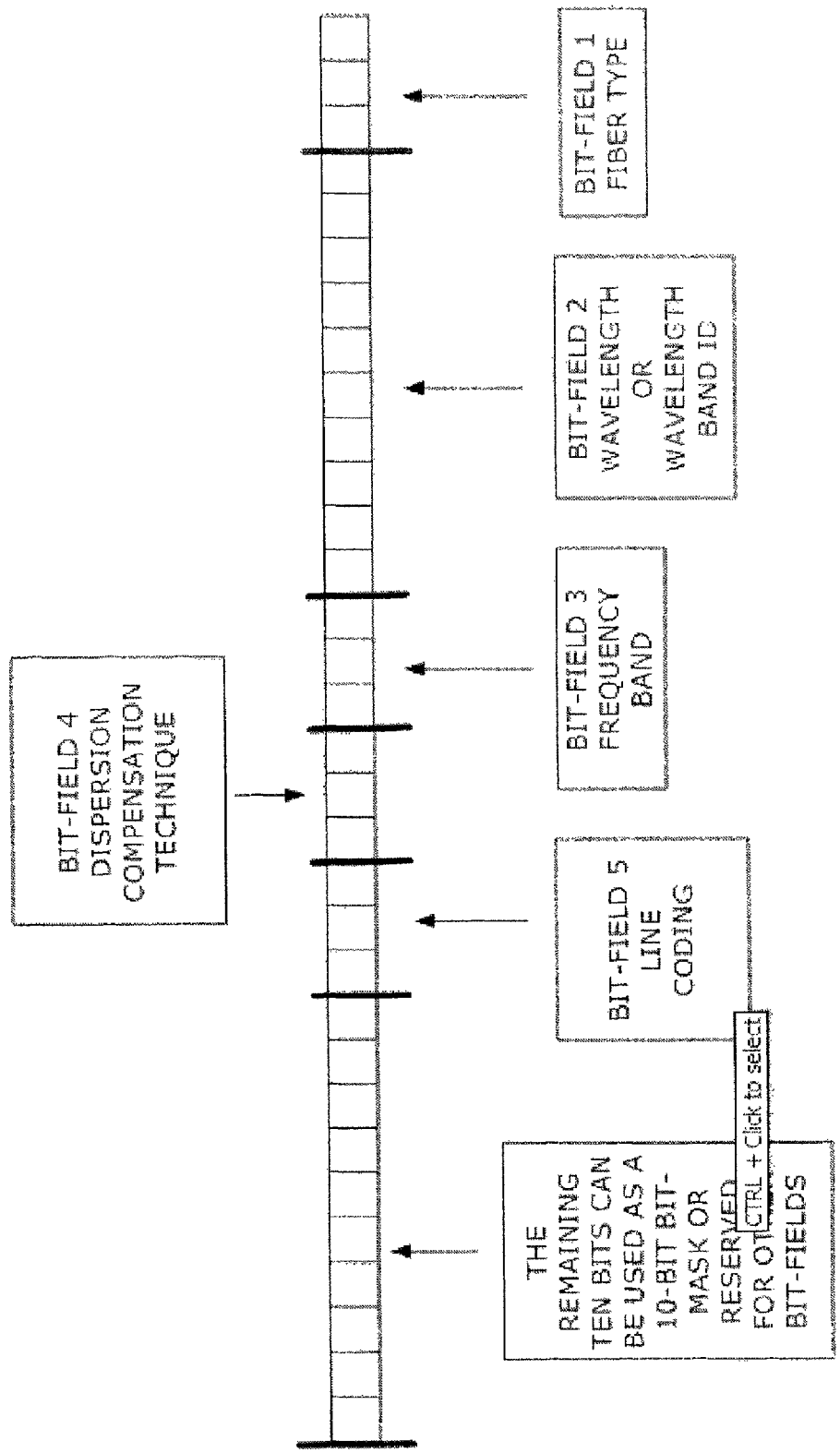
FIG. 2 shows a logical diagram illustrating the layout of a bit-field-encoded resource record according to an embodiment of the present invention. In this embodiment, the resource record has thirty-two bits, although any other record length may be used without departing from the scope of the claimed invention.

FIG. 2 shows an example of a 32-bit resource record that is bit-field encoded according to the principles of the present invention. As stated above, a bit-field-encoded record of 32 bits may be used according to the present invention to represent up to 4 billion different types of optical links. As shown in the example in FIG. 2, the first bit field, Bit-Field 1, is made up of the right-most 3 bits, and it is capable of representing one of eight distinct fiber types; Bit-Field 2 contains 10 bits for representing a wavelength or a wavelength band; Bit-Field 3 comprises 3 bits and represents a frequency band; Bit-Field 4 takes up 3 bits to specify one of eight possible dispersion compensation techniques, and Bit-Field 5 uses 3 bits to represent one of eight distinct line coding schemes that might apply to the link. With these five bit-fields defined in this way, there remains 10 bits in a 32-bit record, which can be used for other purposes, such as specifying a class of information (e.g., high priority, private, sensitive, etc.) the link is configured to carry or reserved for future uses that are not yet defined. Indeed, the remaining ten bits of the record may even be bit-mask-encoded so as to create a resource record that has both a bit-field-encoded portion and a bit-mask-encoded portion. Thus, the bit-field encoding scheme of the present invention uses the 32 bits in a standard integer record much more efficiently than conventional bit-mask schemes. Similar efficiencies may be gained when the present invention is applied to resource records defined to be 4 bits, 16 bits, 64 bits, 128 bits, or any other desired length.

Returning now to FIG. 1, Constraint Processor 115 is configured to receive a service constraint signal (included in or derived from a request to transmit certain information) via input link 141, convert the service constraint to a transport constraint associated with the service constraint, and to send the transport constraint to Routing Processor 120 via link 145. The conversion may be accomplished by any one of various methods known to those of skill in the art, such as creating and using one or more simple look-up tables containing associations between various service and transport constraints. Upon receiving a transport constraint from Constraint Processor 115, Routing Processor 120 retrieves one or more bit-field-encoded records from the plurality of such records in Link State Database 110, and parses those records to identify the links in the network capable of supporting the requested transport constraint. Preferably, once a set of links capable of supporting the requested transport constraint are identified, Routing Processor 120 causes Network Topology Database 107 to be updated to reflect a new network topology formed by the set of links with this capability. In a preferred embodiment, each PXC in the network has a network topology database that is similarly updated to reflect the topology of acceptable links for the requested transmission originated locally at the PXC. Alternatively, as would be recognized by one skilled in the art, the network may be configured to operate using a single, centralized network topology database.

In a preferred embodiment, Routing Processor 120 is further configured to select a route, comprising a subset of links from the set of links in the new network topology, that will be used for transmitting the information. This may be accomplished, as is known in the art, by using a preferred shortest path first (SPF) routing algorithm, such as the Dijkstra SPF (shortest path first) algorithm or the Bellman-Ford Vector algorithm, on the new network topology. The selected route may then be stored in a local or centralized routing table (shown as Routing Table 105 in FIG. 1) and disseminated to the control layer of the next node in the selected route, via link 151, in order to comply with various routing protocol standards, some of which call for periodic updates to some or all of the other routing tables existing throughout a network. Preferably, although not necessarily, each node in the network contains or is associated with a local routing table configured to maintain a record for the selected route for each requested data transmission (or, more particularly, for each source-destination pair in the requested data transmission).

As shown in FIG. 1, Transport Layer 102, which handles the actual switching for PXC Node 100, comprises Cross-Connect Fabric 130 and Cross-Connect Fabric Controller 125. A cross-connect fabric is a switching system, based on either optical or electronic technologies, which has multiple input and output ports for interfacing to other nodes and systems. The key function of Cross-Connect Fabric 130 is to establish cross-connections between the input and output links (shown in FIG. 1 as Input Links 161A-161D and Output Links 171A-171D), according to instructions received from Cross-Connect Fabric Controller 125. Cross-Connect Fabric Controller 125 in turn receives local cross-connect instructions from Routing Processor 120 via link 149. In the example shown in FIG. 1, for instance, Routing Processor 120 might receive routing information from Routing Table 105 which causes Routing Processor 120 to send instructions to Cross-Connect Fabric Controller 125 that the information arriving on Input Link 161A should be passed to the node in the network (not shown in FIG. 1) that is connected to Output Link 171A. In a preferred embodiment, Output Link 171A would have been selected (possibly by a routing processor residing in an upstream node) based on the facts that an associated bit-field-encoded resource record indicated that Output Link 171A supports the requested transport constraint for the transmission, and that the execution of a preferred routing algorithm, such as the Dijkstra shortest path first algorithm or the Bellman-Ford Vector algorithm, determined that Output Link 171A was the best link to use.

Although the example depicted in FIG. 1 shows the processors and controllers in PXC Node 100, as well as the routing tables and databases, as separate components residing in PXC Node 100, those skilled in the art would recognize and appreciate the fact that the invention may be advantageously combined or divided, depending on the needs of the particular implementation, into more or fewer processors, controllers and databases than the number shown in FIG. 1, and that such processors, controllers and databases do not necessarily have to reside at each of the nodes in a network. Accordingly, such alternative configurations are not meant to fall outside the scope of the claimed invention.

Figure 3:
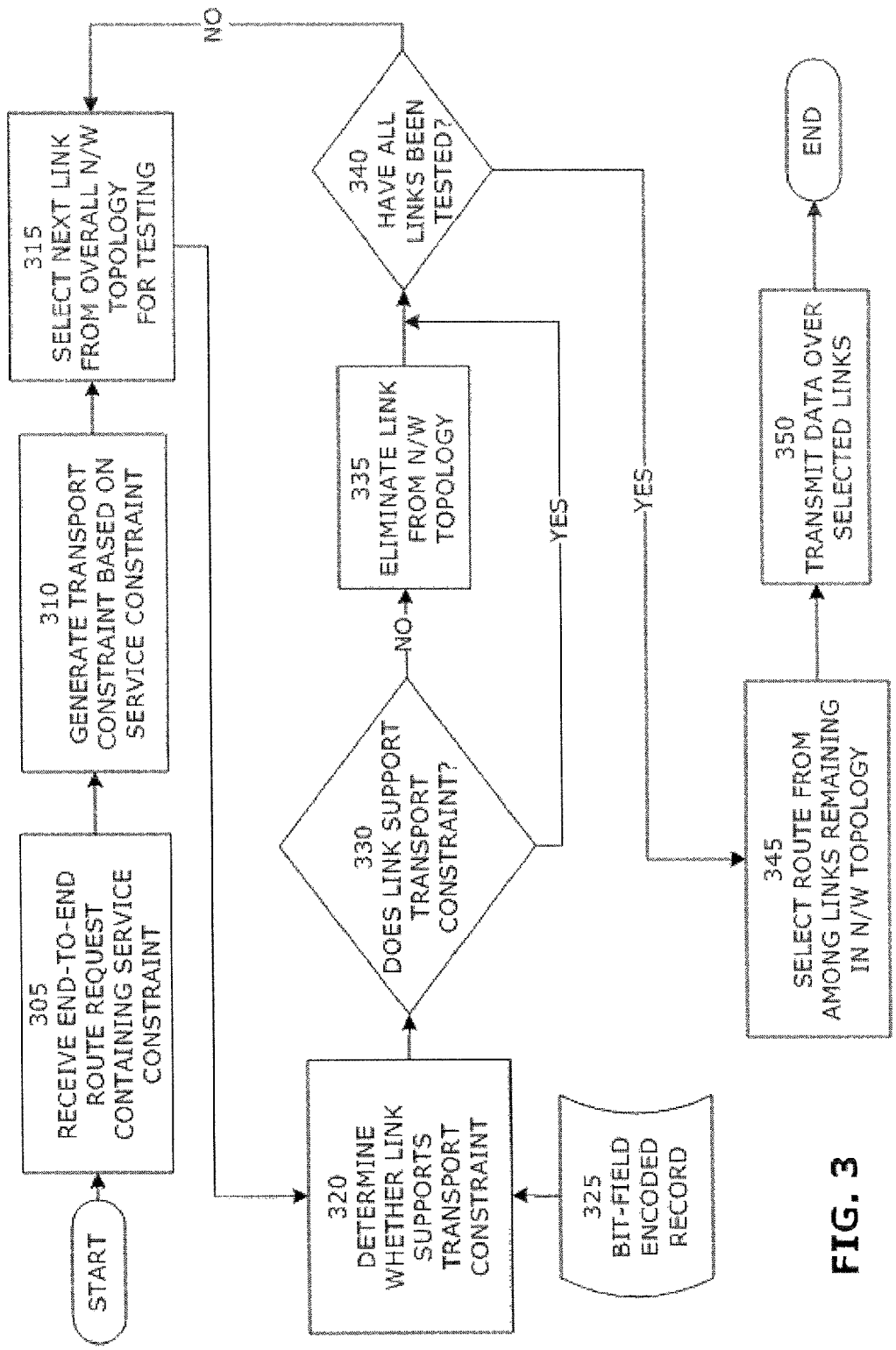
FIG. 3 depicts a flow diagram illustrating the steps performed in a system configured to operate according to an embodiment of the present invention.

FIG. 3 depicts a flow diagram illustrating the steps that might be performed in a system configured to operate according to an embodiment of the present invention. As shown in FIG. 3 at step 305, a dynamic routing operation begins when the system receives an end-to-end route request containing a specified service constraint. Such service constraint might require, for example, using a certain bandwidth for the transmission, using or avoiding a certain node in the communications network, or using or avoiding a certain link in the network. The system next generates a transport constraint (step 310) corresponding to the specified service constraint. For certain wavelengths, for example, depending on the distance the transmission has to travel, a certain dispersion technique may be required. The dispersion technique is a transport constraint associated with the specified service constraint.

The following example illustrates how step 310 may be accomplished in an embodiment of the present invention. Suppose the end-to-end route request received at step 305 requires transmitting data from node A to node Z using only optical signals (i.e., without converting the optical signals to electronic signals at any point during the transmission) having a bandwidth of 10 gigabytes/sec. Such a request contains three service constraints: a travel distance equal to the distance from node A to node Z; a path that is completely transparent from end-to-end; and a bandwidth of 10 gigabytes/sec. As long as these three conditions are satisfied, the service constraints are satisfied.

The first service constraint (distance=A-to-Z), determines whether the signal is likely to be adversely affected by dispersion and other non-linear impairments that occur during transmission. The second service constraint (end-to-end transparency) requires that no OEO regeneration occur over the entire route. The third service constraint (bandwidth=10 gigabytes/sec), in conjunction with the first two service constraints, determines the type of optical fiber that may be used for the transmission (e.g., standard single-mode fiber, dispersion-shifted fiber, or non-zero dispersion fiber, etc), and what type of dispersion compensation technique (a technique for ameliorating dispersion and other non-linear impairments in longer transmissions over optical fiber), if any, will be required. The 10 gigabytes/sec bandwidth requirement may also exclude the use of optical fibers that are reserved for 20-40 Gbps transmission service requests.

Using computer and microprocessor programming techniques generally known to those of skill in the art, a processor or controller residing at node A, for example, may be programmed to select and assign the appropriate transport constraints for the transmission based on the service constraints. Thus, for example, a computer program or processor residing in, controlling or associated with node A may be programmed to select and assign the following transport constraints to the requested transmission: (a) dispersion-shifted optical fiber with dispersion compensation fiber capability; (b) using only PXCs (no electronic or optoelectronic switches); and (c) only a single wavelength from end-to-end (A to Z).

Depending on the networking environment where the invention is applied, it may not always be necessary to convert a service constraint into a transport constraint before testing links to see if they support the transport constraint. This situation might arise, for example, in networking environments capable of handling service requests that specify transport constraints (e.g., dispersion compensation technique, frequency band, fiber type, etc.) directly. In these cases, there would be no need for performing step 310. Such embodiments, however, still fall within the scope of the claimed invention.

Some of the links in the network may not be able to support these transport constraints. Thus, the system next selects a link from the OTN (step 315) and, at step 320, tests that link in order to determine whether it can support the transport constraint. In this case, the link selected for testing may be any link in the overall network topology that has not already been tested. Testing the link is achieved in the present invention, for example, by retrieving from a link state database the bit-field-encoded resource record associated with the selected link (shown as input 325 in FIG. 3), and parsing the retrieved resource record to determine the dispersion technique used with this particular link. In a preferred embodiment, the testing/parsing step (step 320) is carried out using a specified bit-field definition configured to tell the system how to group and interpret each bit in the 32-bit resource record. For example, if the specified bit-field definition defines a 32-bit resource record like the example shown in FIG. 2 above, then the system would parse and retrieve the value stored in Bit-Field 4 of the resource record. If it is determined at step 330, that the link cannot support the transport constraint, then, at step 335, the link is eliminated from the set of links in the OTN that are considered candidates for use in transmitting the data. On the other hand, if it is determined at step 335 that the link can support the transport constraint, the link remains a candidate for the data transmission and may be designated as included in a new network topology comprising only those links that can support the transport constraint. Preferably, the communications network contains one or more network topology databases configured to maintain an up-to-date record of the new network topology formed by the links capable of supporting the required transport constraints.

Next, control passes to step 340, where the system determines whether all links in the overall network topology have been tested. If so, control passes back to step 315, where another link is selected for testing. However, if all the links in the overall network topology have been tested, then control passes to step 345, where the system selects a route from among the set of links forming the new network topology. As stated above, this may be accomplished, as is known in the art, by using a preferred SPF, such as the Dijkstra SPF algorithm or the Bellman-Ford Vector algorithm on the new network topology. Finally, at step 350, after the route has been selected, the data is transmitted to its destination over the selected route.

The above-described preferred embodiments are intended to illustrate the principles of the invention, but not to limit its scope. Although an embodiment of the invention has been described in its preferred form with a certain degree of particularity, it is understood that numerous changes in the details of the structures and the combination of the individual elements may be resorted to without departing from the spirit and scope of the invention. Various other embodiments may occur to those skilled in the art upon reading the present disclosure or practicing the claimed invention. Such variations, modifications and equivalents are intended to come within the scope of the invention and the appended claims.

What is claimed is:

1. A method comprising:
   receiving a resource record that is bit-field-encoded for specifying link information about one or more links within a communications network; and
   determining a path, based on the resource record, over the communications network for transporting data, wherein the network is an optical network, and the resource record includes one of a line-coding field, a dispersion compensation technique field, a frequency band field, a fiber type field, or a combination thereof.

2. A method according to claim 1, wherein the resource record further includes a bit-mask encoded field.

3. A method according to claim 1, wherein the link information specifies service constraints including one of a request to avoid using a specified node, a request to avoid using a specified link, a request to use a specified link, or a combination thereof.

4. A method according to claim 1, wherein one of the links is configured to transport either an optical signal, an electrical signal, or a wireless signal.

5. A method according to claim 1, wherein the link information is provided to a link state routing protocol to determine the path, the link state routing protocol uses one of a shortest path first (SPF) routing algorithm, Dijkstra SPF algorithm, or a Bellman-Ford Vector algorithm.

6. An apparatus comprising:
   a routing processor configured to receive a resource record that is bit-field-encoded fields for specifying link information about one or more links within a communications network,
   wherein the routing processor is further configured to determine a path, based on the resource record, over the communications network for transporting data; and
   wherein the network is an optical network, and the resource record includes one of a line-coding field, a dispersion compensation technique field, a frequency band field, a fiber type field, or a combination thereof.

7. An apparatus according to claim 6, wherein the resource record further includes a bit-mask encoded field.

8. An apparatus according to claim 6, wherein the link information specifies service constraints including one of a request to avoid using a specified node, a request to avoid using a specified link, a request to use a specified link, or a combination thereof.

9. An apparatus according to claim 6, wherein one of the links is configured to transport either an optical signal, an electrical signal, or a wireless signal.

10. An apparatus according to claim 6, wherein the link information is provided to a link state routing protocol to determine the path, the link state routing protocol uses one of a shortest path first (SPF) routing algorithm, Dijkstra SPF algorithm, or a Bellman-Ford Vector algorithm.

11. A system comprising:
    one or more optical nodes, each configured to transport data over links of an optical network, wherein the optical node includes,
       a memory configured to store a resource record that is bit-field-encoded for specifying link information about the links, and
       a routing processor configured to determine a path, based on the resource record, over the optical network;
    wherein the link information includes a service constraint, and the optical node further includes a constraint processor to transform the service constraint to a transport constraint for use by the routing processor to determine the path, the transport constraint including one of a line-coding field, a dispersion compensation technique field, a frequency band field, a fiber type field, or a combination thereof.

12. A system according to claim 11, wherein the resource record further includes a bit-mask encoded field.

13. A system according to claim 11, wherein the link information specifies service constraints including one of a request to avoid using a specified node, a request to avoid using a specified link, a request to use a specified link, or a combination thereof.

14. A system according to claim 11, wherein the optical node is a phototonic cross-connect.

15. A system according to claim 11, wherein the link information is provided to a link state routing protocol to determine the path, the link state routing protocol uses one of a shortest path first (SPF) routing algorithm, Dijkstra SPF algorithm, or a Bellman-Ford Vector algorithm.

16. A system according to claim 11, further comprising:
    a link state database configured to store a plurality of resource records, wherein the link state database is accessible by the optical nodes.

* * * * *